United States Patent

Pochmara

[11] 4,228,388
[45] Oct. 14, 1980

[54] CONTROL CIRCUIT RESPONSIVE TO UTILITY VOLTAGE LEVEL

[75] Inventor: Gary E. Pochmara, Highland, Mich.

[73] Assignee: Overhead Conveyor Company, Ferndale, Mich.

[21] Appl. No.: 896,305

[22] Filed: Apr. 14, 1978

[51] Int. Cl.³ .............................................. H02P 7/36
[52] U.S. Cl. .................................................... 318/770
[58] Field of Search ........................................ 318/770

[56] References Cited

U.S. PATENT DOCUMENTS

| | | | |
|---|---|---|---|
| 2,445,434 | 7/1948 | Hornbarger | 318/770 |
| 2,707,763 | 5/1955 | Kurtz | 318/770 |
| 3,391,319 | 7/1968 | Quinn | 318/770 |
| 3,488,569 | 1/1970 | Allendorph et al. | 318/770 |
| 3,601,618 | 8/1971 | Toyonaka et al. | 318/770 |

Primary Examiner—J. V. Truhe
Assistant Examiner—Eugene S. Indyk
Attorney, Agent, or Firm—Barnes, Kisselle, Raisch & Choate

[57] ABSTRACT

A control circuit for automatically rewiring electrically powered apparatus, such as a dual voltage multiple-phase motor, to adapt such apparatus to be powered by utility voltage at an available voltage level. The control circuit includes relays responsive to the unknown utility voltage level and relay switches adapted to so connect apparatus input leads to each other as to adapt such apparatus to be powered at the particular utility voltage level corresponding to the unknown voltage level.

2 Claims, 1 Drawing Figure

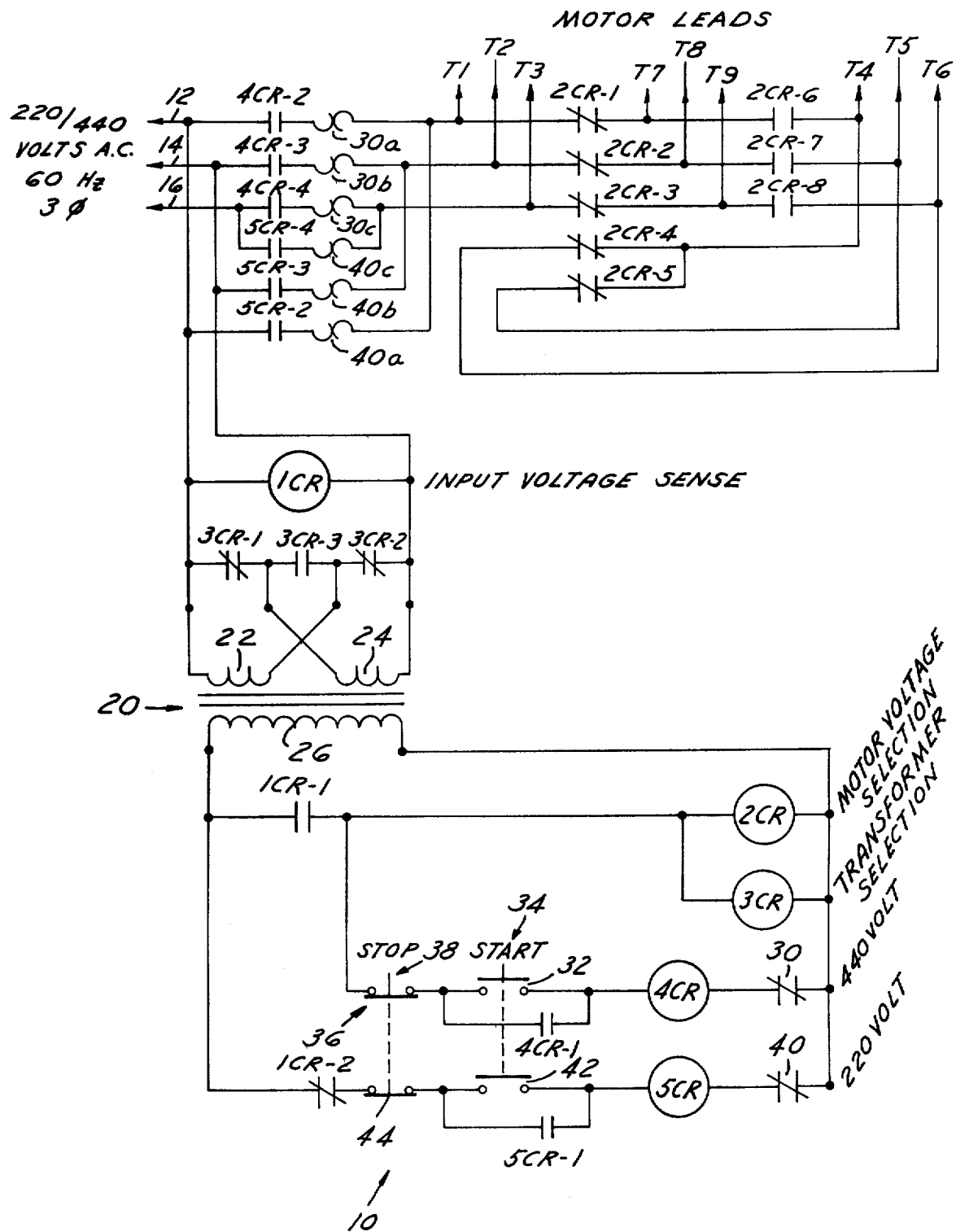

CONTROL CIRCUIT RESPONSIVE TO UTILITY VOLTAGE LEVEL

The present invention relates to control circuits of the type adapted to apply utility power to electrically-powered apparatus.

It is often the practice in industry to build electrically powered apparatus, such as motors, transformers or welders, such that the apparatus may be powered and operated at any one of a number of discrete input voltage levels depending upon the manner in which leads or conductors extending from such apparatus are connected to each other and to the input voltage line. One prominent example of such apparatus is a conventional three phase dual voltage induction motor having nine input leads for interconnection selectively to adapt the internal motor circuitry to be powered by either 220 or 440 volts a.c. When apparatus of this type is provided to a customer, the most readily available utility voltage level is often unknown to the manufacturer, leaving it to the customer to connect the apparatus leads as required.

An object of the present invention is to provide a control circuit adapted to be connected between such apparatus and a source of utility power at unknown discrete voltage level, and to sense the utility voltage level and effectively wire the apparatus to be powered accordingly.

The invention, together with additional objects, features and advantages thereof, will be best understood from the following description, the appended claims and the accompanying drawing which is a schematic diagram of a presently preferred embodiment of the control circuit provided by the invention.

Referring to the drawing, a control circuit 10 is illustrated as including control relays 1CR, 2CR, 3CR, 4CR and 5CR having contact sets suitably interconnected to indicate and be responsive to various control conditions as will be described in detail hereinafter. Three phase power input leads 12,14 and 16 are connected by means not shown to a suitable source of utility power at an unknown one of a preselected number of discrete voltage levels. In the particular embodiment described herein, three phase voltage at either 220 or 440 volts a.c. is contemplated. Leads 12,14 are connected across the sensing coil of control relay 1CR. A voltage transformer 20 has a pair of primary windings 22,24 and a secondary winding 26. Normally closed relay contact sets 3CR-1 and 3CR-2 are connected in series across relay 1CR, with normally open relay contact set 3CR-3 being connected therebetween. Primary winding 24 is connected across the series combination of contact sets 3CR-2 and 3CR-3, and primary windings 22 is connected across the series combination of contact sets 3CR-1 and 3CR-3. Thus, the electrical connection of primary windings 22,24 to power leads 12,14 is effectively controlled by relay 3CR in a manner to be described hereinafter.

Control relays 2CR and 3CR are respectively connected in series with normally open control relay contact set 1CR-1 across transformer secondary winding 26. A normally closed thermal overload switch 30, relay 4CR, one pole 32 of a normally open start switch 34 and one pole 36 of a normally closed stop switch 38 are connected in series with contact set 1CR-1 across secondary winding 26. Contact set 4CR-1 is connected across start switch pole 32 to latch relay 4CR in the energized condition. A second thermal overload switch 40 is connected in series with relay 5CR, the second normally open pole 42 of start switch 34, the second normally closed pole 44 of stop switch 38 and normally closed contact set 1CR-2 across secondary winding 26, and normally open contact set 5CR-1 is connected across pole 42 to latch relay 5CR in the energized condition.

Power input line 12 is connected through the a normally open contact set 4CR-2 and a thermal overload sensor 30a, and in parallel through a second normally open contact set 5CR-2 and a thermal sensor 40a. Similarly, input lines 14 and 16 are connected through contact sets 4CR-3, 5CR-3 and thermal sensors 30a, 40b, and contact sets 4CR-4, 5CR-4 and thermal sensors 30c, 40c, respectively. Thermal sensor units 30a—30c and 40a—40c control corresponding switches 30,40 previously described. An array of normally closed relay contacts sets 2CR-1 to 2CR-5 and normally open contact sets 2CR-6 to 2CR-8 is connected to motor leads T1 to T9 as illustrated. The motor (not shown) may be any one of the usual nine-lead dual voltage induction motors known in the art. The particular motor for which the present circuit was designated is a model NO. M3707 manufactured by Baldor Electric Co. of Ft. Smith, Ark.

Operation of the invention will be described in connection with its preferred application for adapting electrically powered apparatus to operate on either 220 volts a.c. or 440 volts a.c. input. In such application, control relay 1CR is selected to be responsive to a voltage level of 440 volts a.c., and thereby closes contact set 1CR-1 and opens contact set 1CR-2 at an input voltage of 440 volts three phase, but leaves the respective contact sets in their normal conditions at an input level of 220 volts. At 220 volts input, contact set 1CR-1 remains open and relays 2CR and 3CR are deenergized, such that primary windings 22,24 are effectively connected in parallel through normally closed contact sets 3CR-1 and 3CR-2 to supply a 120 volts a.c. control voltage at secondary winding 26. On the other hand, at a 440 volt input level, contact set 1CR-1 is closed to energize relay 3CR, open contact sets 3CR-1, 3CR-2 and close contact set 3CR-3. Windings 22,24 are thereby connected in series, such that a 120 volt a.c. control voltage is effectively provided at secondary 26 independently of the particular input voltage level.

At 220 volts input, contact set 1CR-2 is closed, such that relay 5CR is energized when start switch 34 is depressed and is thereafter latched in the energized condition by contact set 5CR-1. Contact sets 5CR-2 to 5CR-4 are thereby closed effectively to connect contact sets 2CR-1 to 2CR-8 to the power input lines through the associated (220 volt) overload sensors 40a—40c. The motor is thereby connected to 220 volt input power until stop switch 38 is depressed or until switch 40 is opened by means of one of the sensor 40a—40c, either of which conditions deenergizes relay 5CR and open contact sets 5CR-1 to 5CR-4. Similarly, a sensed 440 volt input level energizes relay 4CR when start switch 34 is depressed to connect the 2CR contact array to the power source through contact sets 4CR-2 to 4CR-4 and thermal sensors 30a to 30c. Again, relay 4CR is latched in the energized condition through contact sets 4CR-1 and 1CR-1 until either the stop switch 38 is depressed or thermal switch 30 is opened.

Motor lead control relay 2CR is deenergized at the 220 volt input level since contact set 1CR-1 remains open, and is energized at the 440 input level when contact set 1CR-1 is closed. The specific array of normally closed and normally open contacts sets 2CR-1 to 2CR-8 illustrated in the drawing is for the particular three phase dual voltage motor previously identified. For other motors or similarly powered electrical apparatus such as transformers or welders, modified configurations of the 2CR contact array may be appropriate and readily fashioned by persons skilled in the art given the lead connection information provided by the apparatus manufacturer.

Although the present invention has been described in detail in connection with a specific presently preferred embodiment thereof, modifications and variations will readily suggest themselves to persons skilled in the art. For example, the present invention is applicable in its broadest aspects to two or even single phase operation, although maximum advantage is obtained in three phase operation as described. Similarly, although electromagnetic relays are preferred, other equivalent solid state relay devices or the like may be substituted therefor. In many application relays 2CR and 3CR may be provided as a single unit. The invention is intended to embrace the foregoing and all other alternatives, modifications and variations as fall within the spirit and broad scope of the appended claims.

The invention claimed is:

1. For use in connecting apparatus adapted to be powered by multiple phase electrical energy at either of two discrete voltage levels to a utility power source of unknown voltage level corresponding to one of said two discrete voltage levels, said apparatus including interconnection means adapted to be interconnected in at least two combinations for correspondingly adapting said apparatus to be powered at said two discrete voltage levels, the combination comprising first connection means adapted for connection to a said utility power source;

voltage transformer means having at least two primary windings and a secondary winding;

first control relay means having first voltage sensing means connected to said first connection means and adapted to be responsive to the voltage level of the said utility power source, first relay switch means responsive to said first voltage sensing means for connecting said at least two primary windings to said first connection means in series at one of said two voltage levels and in parallel at the other of said two voltage levels such that a control voltage is provided at said secondary winding at a preselected discrete voltage level which is independent of said unknown voltage level, and second relay switch means responsive to said first voltage sensing means; and second control relay means including second voltage sensing means connected in series with said second relay switch means across said secondary winding and third relay switch means responsive to said control voltage through said second voltage sensing means and to said unknown voltage level through said second relay switch means to so interconnect said interconnection means to said first connection means as to adapt said apparatus to be powered at a one of said two discrete voltage levels corresponding to said unknown voltage level.

2. The combination set forth in claim 1 wherein said primary windings include first and second electrically discrete primary windings each connected at one winding end to said first connection means, and wherein said first relay switch means includes a first relay switch having a first conductive condition connected in series between the other ends of said first and second primary windings, and second and third relay switches having conductive conditions opposite to said first conductive condition and respectively electrically connected between the said other end of each said primary winding and the said one end of the other primary winding, such that said primary windings are connected in series when said first relay switch means is in a closed conductive condition and said second and third relay switch means are in an open conductive condition, and are connected in parallel when said first relay switch means is in an open conductive condition and said second and third relay switch means are in a closed conductive condition.

* * * * *